United States Patent [19]

Ditzel

[11] Patent Number: 4,587,632
[45] Date of Patent: May 6, 1986

[54] LOOKAHEAD STACK ORIENTED COMPUTER

[75] Inventor: David R. Ditzel, Watchung, N.J.

[73] Assignee: AT&T Bell Laboratories, Murray Hill, N.J.

[21] Appl. No.: 153,277

[22] Filed: May 27, 1980

[51] Int. Cl.$^4$ .............................................. G06F 9/00
[52] U.S. Cl. ..................................... 364/900; 364/736
[58] Field of Search ... 364/200 MS File, 900 MS File, 364/709, 736, 200, 900

[56] References Cited

U.S. PATENT DOCUMENTS

| | | | |
|---|---|---|---|
| 4,037,207 | 7/1977 | Burney et al. | 364/200 |
| 4,042,913 | 8/1977 | Birney et al. | 364/200 |
| 4,062,059 | 12/1977 | Suzuki et al. | 364/200 |
| 4,210,960 | 7/1980 | Borgerson et al. | 364/200 |

OTHER PUBLICATIONS

PDP 11/45 Handbook, published by Digital Equipment Corporation, Maynard, Massachusetts, 1971.

*Primary Examiner*—Gareth D. Shaw
*Assistant Examiner*—John G. Mills
*Attorney, Agent, or Firm*—Robert O. Nimtz

[57] ABSTRACT

A computer architecture is disclosed which obtains the advantages of stack oriented machines from a programming viewpoint and, at the same time, obtains the hardware advantages of a multiple operand architecture from the hardware viewpoint. This is accomplished by circuitry (13) which accepts stack oriented reverse-polish instruction tokens from the memory (10) and, by using a lookahead technique (23), optimizes the generation of storage-to-storage type instructions which are then executed by the storage-to-storage hardware configuration (14).

9 Claims, 4 Drawing Figures

FIG. 1

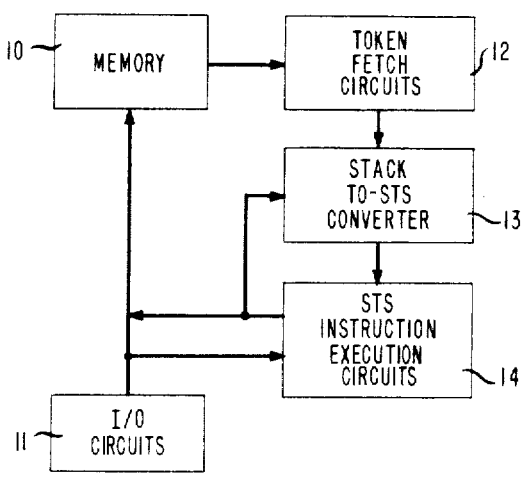

FIG. 4

| IS OP A STORE? | IS LA A STORE? | TOS | OP | LA | NEW INSTRUCTION |
|---|---|---|---|---|---|
| YES | NOT APPLICABLE (N.A.) | B | ← | N.A. | a←b |
| | | | → | N.A. | b←a |
| | | | nd← | N.A. | rA,a←b |
| | | | nd→ | N.A. | rA,b←a |
| | | C | ← | N.A. | b←c |
| | | | → | N.A. | c←b |
| | | | nd← | N.A. | rB,b←c |
| | | | nd→ | N.A. | rB,c←b |
| NO | NO | B | OP | N.A. | rA←a OP b |
| | | C | OP | N.A. | rB←b OP c |
| | YES | C | OP | ← | a←b OP c |
| | | | | → | c←a OP b |
| | | | | nd← | rA,a←b OP c |
| | | | | nd→ | rA,c←a OP b |

LEGEND:  nd = NON DESTRUCTIVE STORE
OP = OPERATION
a,b,c REFER TO VALUE SPECIFIED BY A,B,C REGISTER.
rX = RESULT STORED IN REGISTER X.
LA = LOOK AHEAD REGISTER 23
N.A. = NOT APPLICABLE

LOOKAHEAD STACK ORIENTED COMPUTER

BACKGROUND OF THE INVENTION

1. Field of the Invention

This invention relates to improved digital computers and, more particularly, to dynamically optimized instruction execution circuits for such digital computers.

2. Description of the Prior Art

Digital computers are machines which retrieve instructions or commands from a computer memory and execute each instruction by performing an indicated operation on one or more operands, also stored in the computer memory. There are three basic steps involved in the execution of each instruction. First, the instruction must be fetched from the computer memory. Second, this instruction must be decoded to determine what operation is to be performed. Finally, the instruction is executed. This process has become known as the "fetch-decode-execute" cycle.

There are three basic types of computer architectures which are classified as to the manner in which the instructions specify the operands to be operated upon. In so-called "register-to-register" architectures, operands are loaded into registers before performing these operations. A second type of architecture, called "storage-to-storage" architecture, specifies each of the operands by a memory address. Such architectures include instructions with one, two or three addresses. The instructions are executed by using the storage address to retrieve the operands and then by performing the indicated operation on those retrieved operands. A final address might be used to indicate the storage location in which the results are to be stored. Register-to-register and storage-to-storage architectures can be mixed with operands sometimes specified by a register and sometimes by an address.

The third type of architecture defines a class called "stack machines." In any machine with such an architecture, the operands are placed on an expression stack, and the instructions are ordered in so-called "reverse-polish" or "postfix" notation. A stack is nothing more than a storage mechanism which obeys a last-in, first-out storage and retrieval sequence.

Although each of the above three basic architectures has its own advantages and disadvantages, stack machines are generally considered to minimize the difficulty in generating code and are also better for evaluating complex expressions. On the other hand, so-called storage-to-storage and register-to-register machines have the advantage of minimizing the number of instruction executions required to complete a given task. As a result, stack machines are less efficient, typically requiring a much larger number of instructions, and hence more fetch-decode-execute cycles and memory references, to perform the same task than does a machine having a storage-to-storage architecture.

It has also been determined that a large percentage of program statements in most high-level languages are simple statements involving three storage locations. An operation is performed on the operands in two of the storage locations and the result assigned to the third storage location. It would thus appear that a storage-to-storage type of computer architecture would be the most efficient for executing such program statements. A discussion of this conclusion can be found in "The Case Against Stacked-Oriented Instruction Sets" by G. J. Myers in *Computer Architecture News*, 1977, pages 7 through 10.

It would be convenient to combine the ease of programming associated with stack oriented machines with the efficient operation of storage-to-storage machines.

SUMMARY OF THE INVENTION

In accordance with the illustrative embodiment of the present invention, the advantages of both stack oriented and storage-to-storage (including register-to-register) oriented computer architectures are realized in a single machine by providing a mechanism in the instruction flow which dynamically converts reverse-polish stack oriented instruction tokens into multiple address storage-to-storage type instructions, which can then be executed by standard multiple address architectured machines. Such a mechanism overcomes the major disadvantage of stack oriented machines (i.e., redundant stores to the stack) by dynamically looking ahead at instruction tokens so as to optimize the multiple address instructions which are generated.

The major advantage of the present invention is the ability to utilize a stack oriented instruction set, optimized for code compaction and ease of code generation, and yet obtain instruction execution on a hardware-optimized computer architecture. This permits the most efficient hardware architecture to be utilized in combination with the most efficient program code from the programmers' viewpoint.

More particularly, standard reverse-polish or postfix oriented instruction tokens are read from the computer memory but, unlike the traditional fetch-decode-execute cycle, they are not executed immediately. Instead, these tokens are temporarily stored in instruction token registers. Instruction tokens are accumulated in the instruction token registers until a sufficient number are available upon which to make an optimum decision as to the appropriate form of a multiple address instruction. When a sufficient number of instruction tokens are available to make this optimization possible, then the instruction tokens are dynamically combined into a single multiple address instruction which can be passed on to a computer using a multiple address instruction architecture. In this way, redundant stores to the stack mechanism are avoided, since operations are not performed until a sufficient number of instruction tokens have been retrieved to indicate the ultimate disposal of the results of the operation. Finally, the results of instruction execution can be placed either directly in the computer memory or left on the top of the stack, should further operations be required. Indeed, the results can be placed both on the stack and in memory storage if that value is required both on a temporary basis or further manipulation and also on a permanent basis as a value stored in the memory.

BRIEF DESCRIPTION OF THE DRAWINGS

In the drawings:

FIG. 1 is a block diagram of a general purpose digital computer organized to take advantage of the instruction token assembly mechanism of the present invention;

FIG. 4 is a decision table which is useful in explaining the operation of a mechanism of FIG. 1 for a limited but practical instruction set.

DETAILED DESCRIPTION

Figure 2:
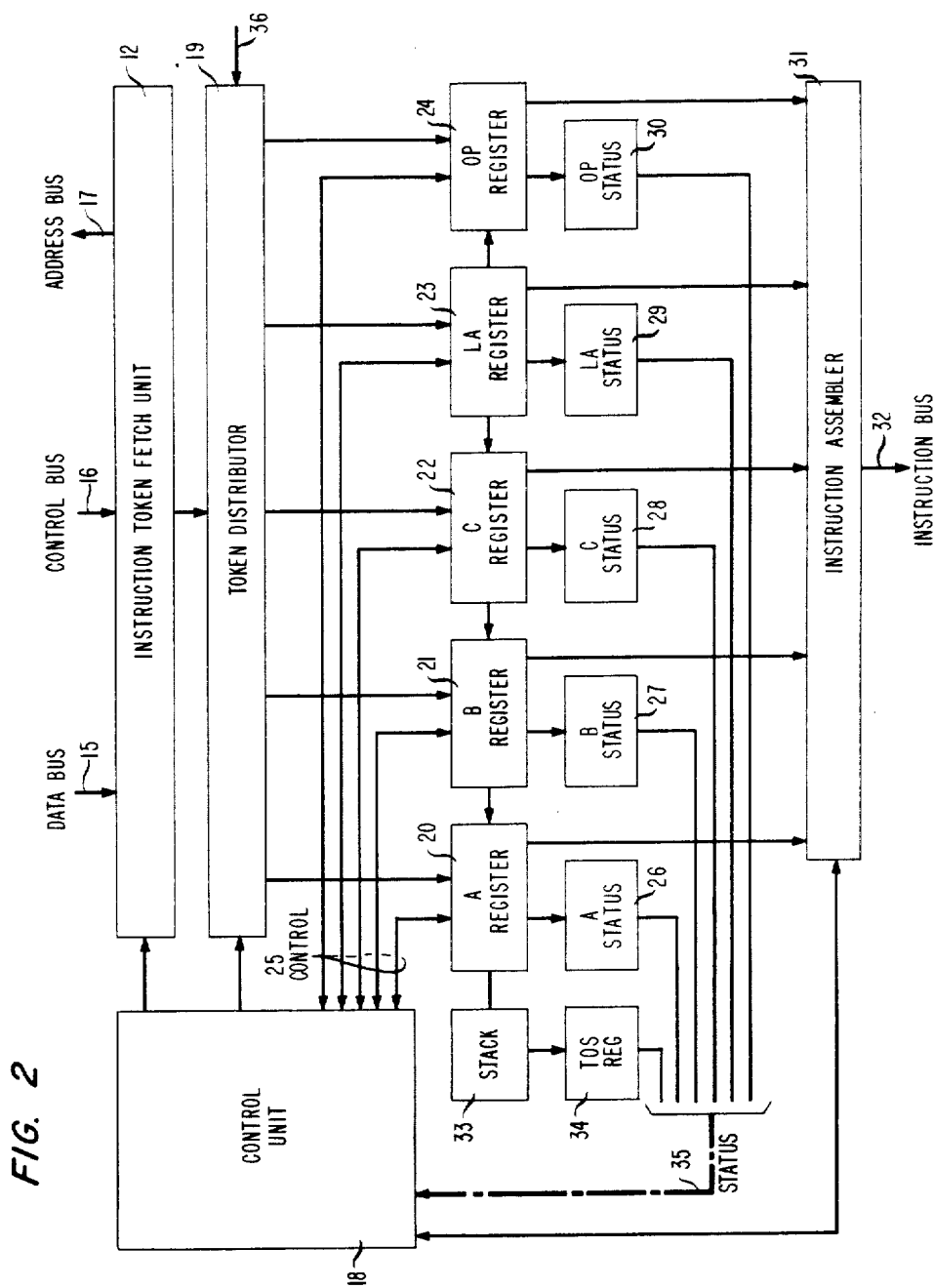
FIG. 2 is a detailed block diagram of an instruction token assembly mechanism that embodies the principles of the invention and which is useful to adapt a multiple address storage-to-storage machine architecture to stack oriented instructions.

Referring more particularly to FIG. 1, there is shown a general block diagram of a computer architecture which is useful in realizing the advantages of the present invention. The computer of FIG. 1 comprises a memory 10 which can be used to store both data and instructions and which comprises standard magnetic core or semiconductor storage elements. Input-output circuits 11 provide means for supplying information to the computer of FIG. 1 and for supplying the results of operations performed by the computer for use external to the computer. Memory 10 is accessed by token fetch circuits 12 which operate to obtain one or more instruction tokens at a time from memory 10, either in sequential storage locations or, when directed by an instruction, from nonsequential storage locations. These instruction tokens are delivered, one at a time, to converter 13. Converter 13 operates, in accordance with the present invention, to convert this serial stream of instruction tokens into storage-to-storage type of instructions which are delivered to instruction execution circuits 14. Instruction execution circuits 14 utilize these instructions to access the memory 10 to obtain the necessary operands for executing the instruction. Circuits 14 then execute these instructions, using the retrieved operands and delivering the results either to memory 10, to an expression evaluation stack in converter 13, or to both of these locations.

It can be seen that the computer architecture of FIG. 1 permits programs to be stored in memory 10 in the form of a sequence of stack oriented instruction tokens in reverse-polish or postfix sequence. It has been determined that this form of program sequence is particularly useful for code generated from compilers to accomplish particular algorithmic procedures. However, program instructions in this form can be inefficient in terms of fetch-decode-execute cycle time and hence the converter 13 is used to convert the stack oriented instruction tokens into a storage-to-storage instruction format. Such reformatted instructions can then be used by execution circuits 14 to actually access the required operands and perform the indicated operation.

It can be seen that the computer architecture of FIG. 1 combines the advantages of reverse-polish stack oriented programming formats with the advantages of storage-to-storage instruction formats. The architecture, therefore, is optimally designed for both the compiler and the hardware and optimally satisfies the particular needs of both.

It should also be noted that the token fetch circuits 12 and converter 13 can be added to a standard storage-to-storage instruction oriented computer and thus provide these advantages to standard computer architectures. It is therefore not necessary to construct an entire new computer in order to obtain these advantages. The modification required, i.e., the addition of circuits 12 and 13, is relatively simple and constitutes a relatively small modification of the computer itself.

In FIG. 2 there is shown a more detailed block diagram of circuits 12 and 13 of FIG. 1. In FIG. 2 the instruction token fetch unit 12 is shown as being connected to a data bus 15, a control bus 16 and an address bus 17. Unit 12 includes an instruction token address counter which provides instruction addresses on bus 17.

In response to address information on bus 17, the memory 10 (FIG. 1) delivers instruction tokens via data bus 15 to unit 12. Thus unit 12 is adapted to provide a continuous stream of instruction tokens which have been stored in memory 10. A control unit 18 controls fetch unit 12 (as well as all of the other elements of FIG. 2) in order to interrupt the token fetch cycle when required. The operation of control unit 18 will be discussed more specifically in connection with FIG. 3.

Instruction tokens which are obtained by fetch unit 12 are delivered to a token distributor 19 which, under the control of control unit 18, supplies these instruction tokens to one of the registers 20 through 24. The register which receives a particular instruction token is determined by control unit 18 in the manner to be described in connection with FIG. 3. Registers 20 through 24 are under the control of control lines 25 from control unit 18. Token distributor 19 also receives the results of instruction executions from circuits 14 (FIG. 1) on lead 35. If needed for further processing, this value can be entered into the expression evaluation stack, i.e., registers 20, 21, 22 and 33, as a token.

Registers 20 through 24 are each capable of holding a computer instruction token and may be constructed of conventional flips-flops and combinatorial logic. Each of registers 20 through 24 has associated with it a status circuit comprising one of status circuits 26 through 30, respectively. Status registers 26 through 30 indicate whether the associated register is empty or full and, in some cases, the type of contents of the register. It will be noted that, in reverse-polish notation, each instruction token is either an operator or an operand. Registers 20, 21 and 22 are reserved for operands. It should be noted that the actual contents of registers 20, 21 and 22 can be either the memory addresses in memory 10 at which the value of that operand is stored, or a data value itself.

Register 24, on the other hand, is reserved for operation codes and the operation status circuit 30 is used to indicate whether register 24 is full or empty and whether the operation is a storage operation or a nonstorage operation. Lookahead (LA) register 23 is used to store the next (operator) instruction token when all of registers 20, 21, 22 and 24 are full. In accordance with the present invention, register 23 permits looking ahead to the next operation token in order to determine how to construct an optimum storage-to-storage type of instruction. The instruction assembler circuit 31, under the control of control unit 18, is used to construct such an instruction which is then placed on instruction bus 32. As can be seen in FIG. 1, the storage-to-storage instructions are used to perform the actual operand accessing and operation execution processes.

A stack 33 comprises an array of registers or memory locations which functions as a traditional push-down stack. That is, the first instruction token to be retrieved from stack 33 is the last token placed on the stack 33. Stack 33 and registers 20, 21 and 22 comprise the expression evaluation stack. A top-of-stack register 34 is used to indicate the logical top of the stack for the operation stored in operation register 24. The top of the expression evaluation stack is determined by the status circuits 26, 27 and 28. The contents of register 34 and status circuits 26 through 30 are supplied to control unit 18 by way of status leads 35.

Figure 3:
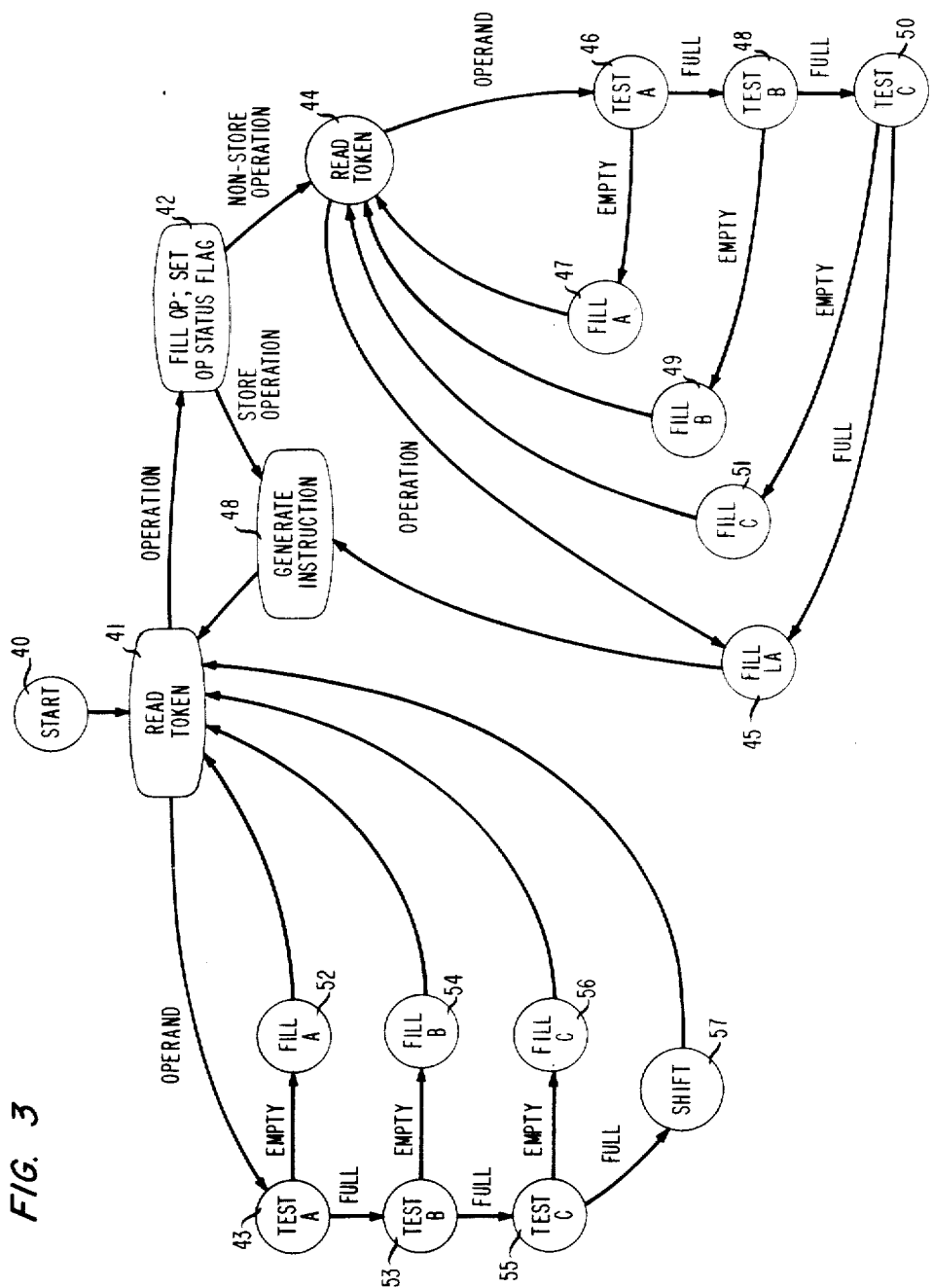
FIG. 3 is a state diagram illustrating the sequence of control that takes place in the instruction mechanism of FIG. 1.

In order to better understand the operation of the circuits of FIG. 2 and, in particular, the operation of control unit 18, a state diagram has been provided in FIG. 3 which demonstrates the sequence of operations of the various circuit elements controlled by control unit 18. The internal construction of control unit 18 will then comprise the necessary logic to implement the state diagram disclosed in FIG. 3. Since the actual circuit details necessary to perform these functions can take on any one of a wide variety of realizations, any one of which is readily apparent to persons of ordinary skill in the art, such realizations have not been shown in detail.

Referring more particularly to FIG. 3, there is shown a state diagram of the operation of the circuits of FIG. 2. The diagram starts in state 40 and processing begins by moving to state 41 where an instruction token is read into fetch unit 12 from memory 10. Depending on whether the token is an operator or an operand, control circuit 18 operates to move to either state 42 or state 43.

If the instruction token is an operand, the circuits of FIG. 2 proceed to state 43 to test whether the A register 20 is empty or full. If A register 20 is empty, the operand token is stored in register 20 (state 52), status register 26 is set to "full" and the circuits then return to state 41. If the A register 20 is full, the circuits proceed to state 53 in which the contents of B register 21 are tested. If register 21 is empty, state 54 is entered in which register 21 is filled with the operand token, status register 27 is set to "full" and return is taken to state 41. If B register 21 is full, state 55 is entered in which C register 22 is tested. If register 22 is empty, state 56 is entered and the operand is stored in register 22, status register 28 is set to "full" and return is taken to state 41. Finally, if the C register 22 is full, state 57 is entered. In state 57, the contents of registers 20, 21 and 22 are shifted to the left with the contents of A register 20 moving to the top of the stack in stack storage mechanism 33, the contents of B registers 21 are moved to A register 20, and the contents of C register 22 are moved to B register 21, thus emptying C register 22 to store the next operand token read.

If an operator token is read in state 41, state 42 is entered: operation register 24 is used to store the operation code and the operation status register 30 is set to "full". If the operation is a store operation, the circuits of FIG. 2 will proceed to state 43 in which an optimal 1-, 2- or 3-address storage-to-storage type of instruction will be generated by instruction assembler 31 as directed by the control unit 18. Thereafter, the circuits will return to state 41.

If, in state 42, the operation instruction in register 24 is not a store instruction, the circuits will proceed to state 44 in which a new instruction token is read. If this instruction token is another operation, the circuits will proceed to state 45, placing the operation token in LA register 23 and then returning to state 43 to generate a storage-to-storage type instruction. If the instruction token is an operand, the circuits will enter state 46. In state 46, control circuit 18 will test A register 20 to see if it is full or empty. If it is empty, the operand will be placed in register 20 (state 47) and then return is taken to state 44. If A register 20 is full, the circuits will then proceed to state 48 in which the B register is tested to see if it is empty or full. If the B register is empty, state 49 is entered in which the operand is stored in B register 21 and then the circuits return to state 44. If B register 21 is full, the circuits proceed to state 50 to test C register 22. If C register 22 is empty, the circuits proceed to state 51 in which C register 22 is filled with the operand. The circuits then return to state 44. If the C register 22 is full, the circuits proceed to state 45 in which LA register 23 is used to store the operand. From state 45, the circuits proceed back to state 43 in which a storage-to-storage type of instruction is generated. In each of states 45, 47, 49 and 51 not only is the operand stored in the operand register, but the associated status circuit 26, 27, 28 or 29 is updated to reflect the status of the associated storage register.

It can be seen that the state diagram of FIG. 3 completely specifies the operation of the circuits of FIG. 2, except for instruction assembler 31. Instruction assembler 31 can be implemented with a read-only memory or with combinatorial logic. A read-only memory, for example, could contain skeletons of all possible storage-to-storage instructions and the proper one selected by logic circuits responsive to the control unit 18 and the combination of the contents of registers 23 and 24. The addresses (or values) in the other registers (20, 21 and 22) could then be added in appropriate fields. The generated instruction can be organized in any manner which is suitable for actual execution by the computer hardware. For example, operand addresses and operation codes can be expanded, decoded or more efficiently organized for execution. Furthermore, these new instructions are efficient to execute since the result of the operation can be stored directly in the memory unit 10 without first storing the result into an expression evaluation stack memory as is traditionally done with stack machines. Moreover, 3-address instructions can be generated which are appropriate for advanced hardware implementation techniques such as the use of a multiport memory or pipelining.

As can be seen in connection with FIG. 3, the operation of the circuits of FIG. 2 permits the collection of as many operands as occur in sequence in the instruction token stream. The first operation token, however, causes movement to state 42 which permits further tokens to be read only if the operation is a nonstore operation. Thus, a nonstore operation does not immediately cause the instruction generation state 43 to be entered. This permits the circuits of FIG. 2 to look at the next operation token by placing it in LA register 23, as shown in state 45. Having available these two operations, it is then possible to make an optimum decision as to the form of the storage-to-storage instruction. That is, redundant stores to the stack can be avoided simply by looking at the next operation to see if the results of the previous operation are to be stored or are to be used as an operand in further operations. If the results of the instruction execution are simply to be used for further operations, they need not be stored at all but simply calculated and "pushed on the stack" in the first free one of registers 20, 21 or 22. Unnecessary stores and retrievals from the stack mechanism are therefore avoided, thereby making the architecture of the present invention more efficient, particularly in machines where the stack is implemented as part of the main memory. This lookahead capability can be expanded to two or more instruction tokens if desired. The instruction assembler 31 is adapted to the particular storage-to-storage machine in which the present invention is used. One simple but significant instruction set can be more readily understood from the table of FIG. 4.

In FIG. 4 there is shown a table of the possible contents of the various registers of FIG. 2 and the resulting storage-to-storage type instructions which would be generated for a limited but practical set of instructions. These instructions are shown in symbolic form in the right-hand column of the table of FIG. 4. It will be noted that the arrangement of the present invention permits both destructive and nondestructive stores. That is, traditional stack machines are able to take the value on the top of the stack and store it into the memory. If the stack value is removed, it is a destructive store; if the stack value is retained on the stack, it is a nondestructive store. The architecture of the present invention does not require an instruction to put the value of the previous execution onto the stack in order to perform a nondestructive store. Instead, the results of the instruction execution are placed in memory (like a destructive store) or in memory and on the stack (like a nondestructive store), all in the same execution cycle. In a conventional stack oriented computer, this same result would require separate execution cycles for storage on the stack and storage in the main memory.

It will be noted that multiple operand instructions can refer to register-to-register computer architectures as well as storage-to-storage, and also mixed architectures. Hence, the present invention will find use as a modification to register-to-register and mixed architectures as well as storage-to-storage architectures.

Finally, it should also be noted that the operand tokens can be either values or addresses of values, or can be mixed. So long as the instruction execution circuitry is aware of which they are and treats them appropriately, the instruction assembly circuits of the present invention can ignore this distinction.

I claim:

1. A stack oriented microprocessor computer system comprising
    a main memory (10) for storing programs comprising a plurality of reverse polish (i.e., postfix) stack oriented instruction tokens,
    a stack memory (33), and an instruction execution unit (14)
    characterized by
    an operand stack storage mechanism (20,21,22) for storing tokens received from said main memory and referring to operands,
    an operator storage mechanism (24) for storing tokens received from said main memory and referring to operators,
    at least one lookahead storage mechanism (23) for storing either an instruction token referring to an operator received from said main memory or an instruction token referring to an operand following an instruction token referring to an operator received from said main memory, and
    means (18 and 31) responsive to said storage mechanisms for optimizing storage accesses by dynamically combining a plurality of said operand tokens and said operator tokens for simultaneous execution by said instruction execution unit.

2. The stack oriented computer system according to claim 1
    characterized in that
    said operand stack mechanism includes at least three storage registers (20,21,22), and
    a status circuit (26,27,28) is associated with each of said storage registers for indicating the empty-full status of the associated storage register.

3. The stack oriented computer system according to claim 1, said optimizing means being
    characterized by
    means (18 and 31) for generating multiple address storage-to-storage type of instructions from the contents of said storage mechanisms.

4. The stack oriented computer system according to claim 1, said optimizing means being
    characterized by
    means (18 and 31) for generating multiple address register-to-register type of instructions from the contents of said storage mechanisms.

5. The stack oriented computer system according to claim 1
    characterized in that
    each of said storage mechanisms comprises at least one storage register (20-24).

6. The stack oriented computer system according to claim 1
    characterized in that
    each of said operand storage mechanisms comprises means for storing either an operand value or a storage location at which the value of said operand is stored.

7. The stack oriented computer system according to claim 3 or 4
    characterized in that
    said instruction generating means (31) is enabled by the presence of a storage operator token in said operator storage mechanism (24) or by the presence of a nonstorage operator token in said operator storage mechanism (24) and an instruction token in said lookahead register (23).

8. The method of executing reverse-polish computer instruction sequences stored in the memory of a computer
    characterized by the steps of
    (1) fetching reverse-polish instructions from said memory (12),
    (2) placing operand instructions in a first-in, first-out storage register (20,21,22,33),
    (3) placing operator instructions in a separate operator storage register (24),
    (4) placing at least one instruction following an operator instruction in a lookahead storage register (23), and
    (5) utilizing the contents of said storage registers to dynamically generate nonredundant, multiple address, optimized storage-to-storage or register-to-register instructions (18 or 31).

9. The method according to claim 8 further
    characterized by the steps of
    (6) executing said storage-to-storage or register-to-register instructions, and
    (7) selectively returning the results of the execution of said instructions to said memory, to said first-in, first-out storage register, or to both.

* * * * *